United States Patent [19]  [11] 4,371,672
Younes  [45] Feb. 1, 1983

[54] THERMOPLASTIC MOLDING COMPOSITION

[75] Inventor: Usama E. Younes, West Chester, Pa.

[73] Assignee: Atlantic Richfield Company, Los Angeles, Calif.

[21] Appl. No.: 329,158

[22] Filed: Dec. 10, 1981

[51] Int. Cl.³ .................... C08G 65/48; C08L 71/04
[52] U.S. Cl. .................................. 525/391; 525/390; 525/392; 525/396; 525/397; 525/535; 525/538
[58] Field of Search .................. 525/39 D, 385, 391, 525/392, 396, 397, 91

[56] References Cited

U.S. PATENT DOCUMENTS 4,313,864  2/1982  Haaf et al. ............................. 525/92

Primary Examiner—J. Ziegler
Attorney, Agent, or Firm—Dennis M. Kozak

[57] ABSTRACT

A thermoplastic molding composition which comprises a mixture of two thermoplastic polymers which are at least partially miscible in one another is disclosed. In one embodiment, this invention pertains to a homogeneous mixture of a polyphenylene oxide and a phosphorus-containing alternating substantially linear copolymer. In another embodiment, this invention pertains to a mixture of polyphenylene oxide and a phosphorus-containing alternating cross-linked copolymer which mixture is at least partially miscible.

2 Claims, No Drawings

THERMOPLASTIC MOLDING COMPOSITION

This invention relates to thermoplastic molding compositions.

More specifically, this invention pertains to a thermoplastic molding composition which comprises a mixture of two thermoplastic polymers which are at least partially miscible in one another. In one embodiment, this invention pertains to a homogeneous mixture of polyphenylene oxide and a phosphorus-containing alternating substantially linear copolymer. In another embodiment, this invention pertains to a mixture of polyphenylene oxide and a phosphorus-containing alternating cross-linked copolymer which mixture is at least partially miscible.

It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, *Principles of Polymer Chemistry*, Cornell University Press, 1953, Chapter 13, page 555.

The present invention provides a novel thermoplastic molding composition which comprises a mixture of two thermoplastic polymers which are at least partially miscible in one another. Moreover, in as much as one of the polymers contain phosphorus units the resulting molded products have been found to exhibit excellent fire retardancy.

According to this invention, there is provided a thermoplastic molding composition comprising a mixture of two thermoplastic polymers which are at least partially miscible in one another, one polymer being polyphenylene oxide and the other polymer being an alternating copolymer having the formula:

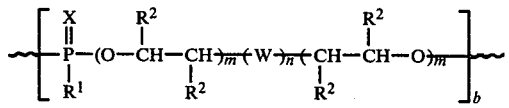

wherein $R^1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, acrylic and methacrylic esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

The thermoplastic molding composition of this invention will contain from about 1 to about 99 weight percent of polyphenylene oxide.

Methods for the production of polyphenylene oxide are well known and are taught, for example, in U.S. Pat. Nos. 3,306,874 and 3,383,435, incorporated herein by reference.

The thermoplastic molding composition will contain from about 1 to about 99 weight percent of the phosphorus containing alternating copolymer.

The alternating copolymer can be prepared by first forming a living polymer dianion by anionic polymerization, using an anionic polymerization initiator, of at least one monomer selected from the group consisting of dienes, styrenes, vinylidene chloride, vinyl esters, acrylic and methacrylic esters and acrylonitrile. The resulting living polymer dianion is then reacted with a monoepoxide to produce a living polymer dioxyanion and the living polymer dioxyanion is then reacted with a phosphorus compound having the formula:

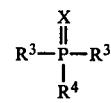

wherein X is as defined above, each $R^3$ separately represents a halogen and $R^4$ represents a halogen, a ($C_1$ to $C_{10}$) alkyl group, a ($C_1$ to $C_{10}$) alkoxy group, an aryl group and an aryloxy group.

Representative of the above phosphorus compounds and particularly suitable for use are: phosphorus(III) chloride, phosphorus(III) bromide, phosphorus(III) iodide, phosphorus(V) tribromide oxide, thiophosphoryl bromide, methyldichlorophosphine, methylphosphonic dichloride, methylphosphorodichloridite, methylphosphorodichloridate, phosphorusoxychloride, methylphosphonothioic dichloride, methylphonic difluoride, ethyldichlorphosphine, ethylphosphonic dichloride, ethylphosphorodichloridite, i-propylphosphonic dichloride, n-propylphosphonic dichloride, n-propylphosphorodichloridite, t-butyldichlorophosphine, n-butylphosphonic dichloride, s-butylphosphonic dichloride, n-butylphosphorodichloridite, n-butylphosphorodichloridate, dibromophenylphosphine, dichlorophenylphosphine, phenylphosphonic dichloride, phenylphosphonothioic dichloride, cyclohexyldichlorophosphine, cyclohexylphosphonic dichloride, ethyldichlorothiophosphate, etc. and the like.

The living polymer dianion can be prepared using any suitable anionic polymerization initiator. Suitable initiators are well known and include the difunctional lithium catalysts designated "DiLi" by Lithium Corporation of America, the dialkali metal reagents (such as, for example, the dipotassium salt) of α-methyl styrene tetramer, and the well-known lithium-napthalene initiator, employed in the examples of this invention.

In the preparation of the alternating copolymers, any monomer (W) or monomer mixture which can be anionically polymerized can be employed. Monomers which can be anionically polymerized are dienes, styrenes, vinylidene chloride, vinyl esters, acrylic and methacrylic esters and acrylonitrile. The term "styrenes" is understood to mean styrene, styrenes which are alkylated in the side chain such as α-methyl styrene and nuclear-substituted styrenes such as, vinyl toluene, t-butylstyrene and ethylvinyl benzene. Styrene monomers are preferred.

Any suitable monoepoxide can be employed. Suitable monoepoxides include propylene oxide, ethylene oxide, styrene oxide, mixtures thereof and the like.

The alternating copolymers may be straight chain, branched or cross-linked depending upon the constituents on the particular phosphorus compound selected and the ratios of reactants employed. For example, if the phosphorus compound contains more than two displaceable halogen groups the amount of branching can be controlled stoichiometrically.

The polymerization reaction is conducted in any suitable inert hydrocarbon or polar solvent such as cyclohexane, tetrahydrofuran, toluene, mixtures thereof, and the like. The polymerization reaction should also be conducted in the absence of oxygen, moisture, carbon dioxide and any other impurity which is detrimental to anionic catalyst systems. The temperature of polymerization may be from about −80° C. to about 120° C., depending upon the freezing point of the solvent employed.

The following examples further demonstrate the invention.

EXAMPLE I

This example demonstrates the preparation of a phosphorus-containing alternating substantially linear copolymer used in the practice of this invention.

A one gallon stirred reactor was charged with about 100 ml of cyclohexane and the reactor contents were sterilized by the addition of sufficient lithium-napthalene initiator to turn the reactor contents dark green.

About 53.2 ml of a 2.2 N lithium-naphtalene initiator and about 30 ml of styrene monomer were charged into the reactor and the polymerization reaction was allowed to proceed for about 30 minutes at 26° C.

About 24 ml of propylene oxide were added to the reactor contents and the contents stirred for about 30 minutes until the contents turned white indicating the conversion of the polystyryl lithium anions to oxyanions.

About 5.6 ml of phosphorus tribramide ($PBr_3$) were then added to the contents of the reactor and the condensation reaction between the $PBr_3$ and the polystyryl lithium dioxyanions were allowed to proceed for about 15 minutes.

A second one gallon stirred reactor was charged with 1,500 ml of cyclohexane and 70 ml of tetrahydrofuran and the temperature maintained at 12° C. The second reactor contents were sterilized by the addition of sufficient lithium napthalene initiator to turn the reactor contents dark green.

About 1.7 ml of a 2.2 N lithium napthalene initiator and about 200 ml of styrene monomer were charged into the second reactor and the reaction to form a polystyryl lithium dianion was allowed to proceed for about 30 minutes.

The contents of the first reactor and the second reactor were then combined and the resulting copolymer was recovered by precipitation from isopropyl alcohol, filtered, washed with methanol and dried under vacuum.

The copolymer was found to be completely soluble in tetrahydrofuran and, accordingly, determined to be substantially a linear copolymer. (The term "substantially linear" is understood to mean a totally linear copolymer or a copolymer in which a minor amount of branching is present due to the phosphorus compound employed as the linking agent.) The copolymer was tested and found to have a bimodal molecular weight distribution with peaks at 144,000 and 5,300 by gel permeation chromatography using polystyrene standards.

Using the alternating copolymer produced in Example I and polyphenylene oxide produced substantially as taught in U.S. Pat. No. 3,306,874, three thermoplastic molding compositions (see TABLE I) were prepared by solution blending various amounts of the polymers.

After solution blending, each composition was separately compression molded on a compression press manufactured by Pasadena Hydraulic, Inc. to form films.

Each composition was analyzed by dynamic mechanical analysis (DMA) to determine the homogeneity of the molded composition.

The compositions and the results of the above analyses are set forth in following Table I:

TABLE I

| Composition (Wt - %) Polyphenylene Oxide Copolymer of Ex. I | Tg by DMA (°C.) |
|---|---|
| 100/0 | 232 |
| 80/20 | 160 |
| 50/50 | 139 |
| 20/80 | 115 |
| 0/100 | 118 |

The above data demonstrate that the compositions of this invention which comprise polyphenylene oxide and a phosphorous-containing alternating substantially linear copolymer as described above are totally miscible, as evidenced by a single glass transition.

EXAMPLE II

This example demonstrates the preparation of a phosphorus-containing alternating partially cross-linked copolymer used in the practice of this invention.

A one gallon stirred reactor was charged with about 2600 ml of cyclohexane and the reactor contents were sterilized by the addition of sufficient lithium-napthalene initiator to turn the reactor contents dark green.

About 87.5 ml of a 1.45 N lithium-napthalene initiator and about 350 ml of styrene monomer were charged into the reactor and the polymerization reaction was allowed to proceed for about 55 minutes during which the temperature of the reaction went from 15° C. to 52° C. and was then cooled to 15° C.

About 8.6 ml of propylene oxide were added to the reactor contents and the contents stirred for about 15 minutes until the contents turned white indicating the conversion of the polystyryl lithium anions to oxyanions.

About 4.4 ml of phosphorus tribramide ($PBr_3$) were then added to the contents of the reactor and the condensation reaction between the $PBr_3$ and the polystyryl lithium dioxyanions was allowed to proceed for about 90 minutes at 45° C., resulting in a large increase in the viscosity of the solution. The reaction was terminated by the addition of about 100 ml of isopropyl alcohol resulting in a substantial drop in viscosity. The polymer was recovered by precipitation in isopropyl alcohol and drying under vacuum at 70° C. for 10 hours.

The copolymer was found to be only slightly soluble in tetrahydrofuran and, accordingly, determined to be a cross-linked copolymer.

Using the alternating cross-linked copolymer produced in Example II and polyphenylene oxide produced substantially as taught in U.S. Pat. No. 3,306,874 a 50/50 blend of the copolymers was prepared (see Table II) by solution blending.

Afer solution blending, the composition was compression molded on a compression press manufactured by Pasadena Hydraulic, Inc. to form a film.

The composition was analyzed by dynamic mechanical analysis (DMA) to determine its homogeneity. The limiting oxygen index (LOI) of the composition was also determined using substantially the procedure entitled "Oxygen Index of Liquids" by Nelson and Webb, *Journal of Fire and Flamability*, Volume 4, p. 210, 1973. The test is taught to be suitable for use on fusible solids as well as liquids.

The results of the above analyses are set forth in following Table II:

TABLE II

| Composition (Wt - %) Polyphenylene Oxide/ Copolymer of Ex. II | Tg by DMA (°C.) | LOI % $O_2$ |
| --- | --- | --- |
| 100/0 | 232 | 26 |
| 50/50 | 108,141 | 35 |
| 0/100 | 114 | 36 |

The above data demonstrate that compositions of this invention which comprise polyphenylene oxide and a phosphorous-containing alternating cross-linked copolymer as described above are at least partially miscible as evidenced by glass transition determination. Moreover, the above data further shows that the thermoplastic molding compositions of this invention exhibit excellent fire retardancy as indicated by LOI.

It will be evident from the foregoing that various modifications can be made to this invention. Such, however, are considered to be within the scope of this invention.

What is claimed is:

1. A thermoplastic molding composition comprising two thermoplastic polymers which are at least partially miscible in one another, one polymer being polyphenylene oxide and the other polymer being an alternating copolymer having the formula:

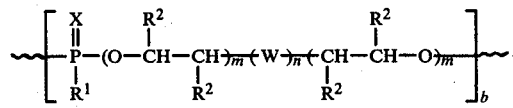

wherein $R^1$ represents a halogen, a ($C_1$ to $C_{10}$) alkyl or halogenated ($C_1$ to $C_{10}$) alkyl group, hydroxy, a ($C_1$ to $C_{10}$) alkoxy or halogenated ($C_1$ to $C_{10}$) alkoxy group, an aryl or halogenated aryl group, and an aryloxy or halogenated aryloxy group; X may or may not be present and represents oxygen or sulfur; W represents at least one monomer selected from the group consisting of dienes, styrenes, vinylidene chloride, vinyl esters, and acrylonitrile; each $R^2$ separately represents hydrogen, a ($C_1$ to $C_4$) alkyl group, or an aryl group; n represents an integer equal to or greater than 2; each m separately represents an integer from 1 to 20, and b represents an integer from 2 to 1000.

2. The thermoplastic molding composition of claim 1 in which said alternating copolymer is substantially linear and said composition is totally miscible.

* * * * *